Feb. 7, 1961   E. B. POOL   2,970,805
VALVES HAVING RESILIENT SEALS
Filed Nov. 14, 1958   4 Sheets-Sheet 2
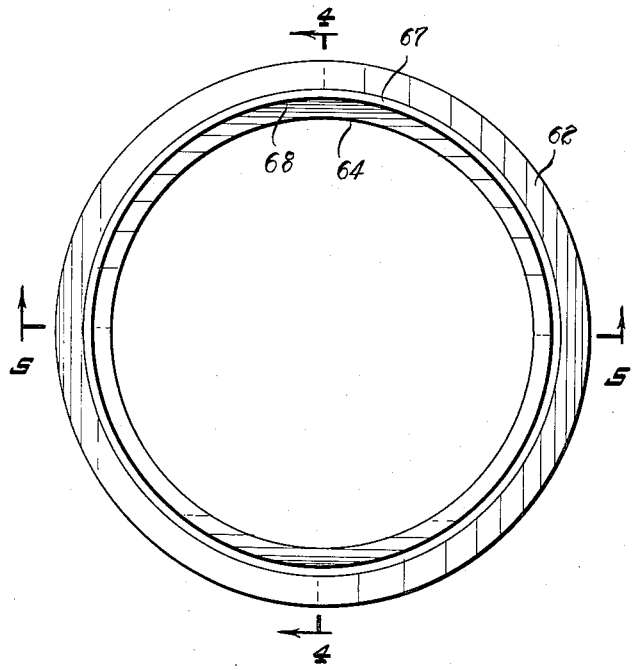
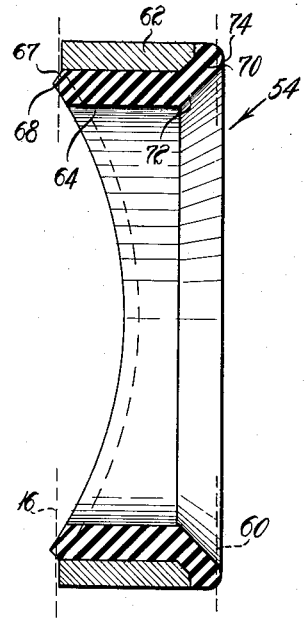
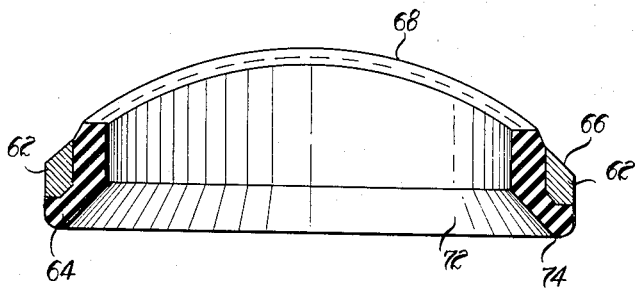
INVENTOR
ELDERT B. POOL
BY Strauch, Nolan & Neale
ATTORNEYS Feb. 7, 1961

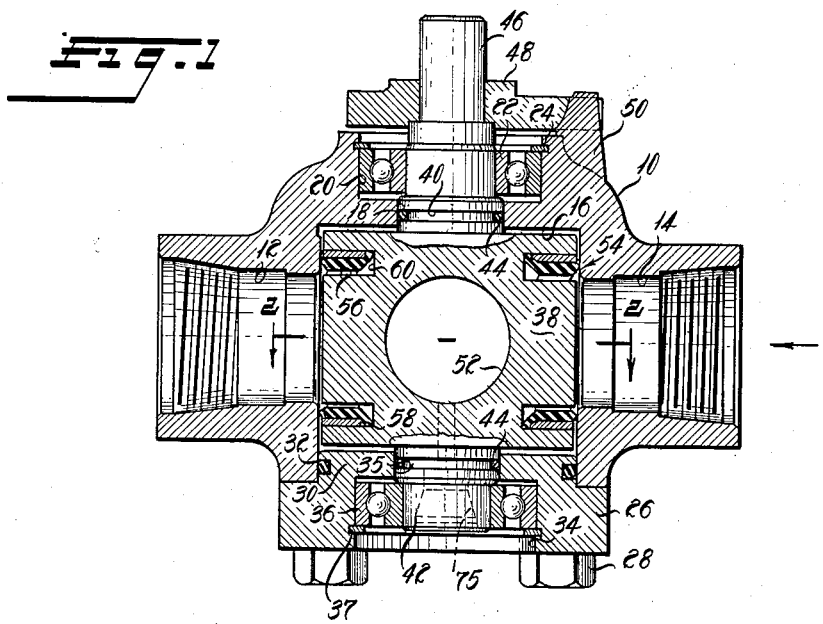

E. B. POOL 2,970,805

VALVES HAVING RESILIENT SEALS

Filed Nov. 14, 1958

INVENTOR
ELBERT B. POOL

BY
Strauch, Nolan & Neale

ATTORNEYS

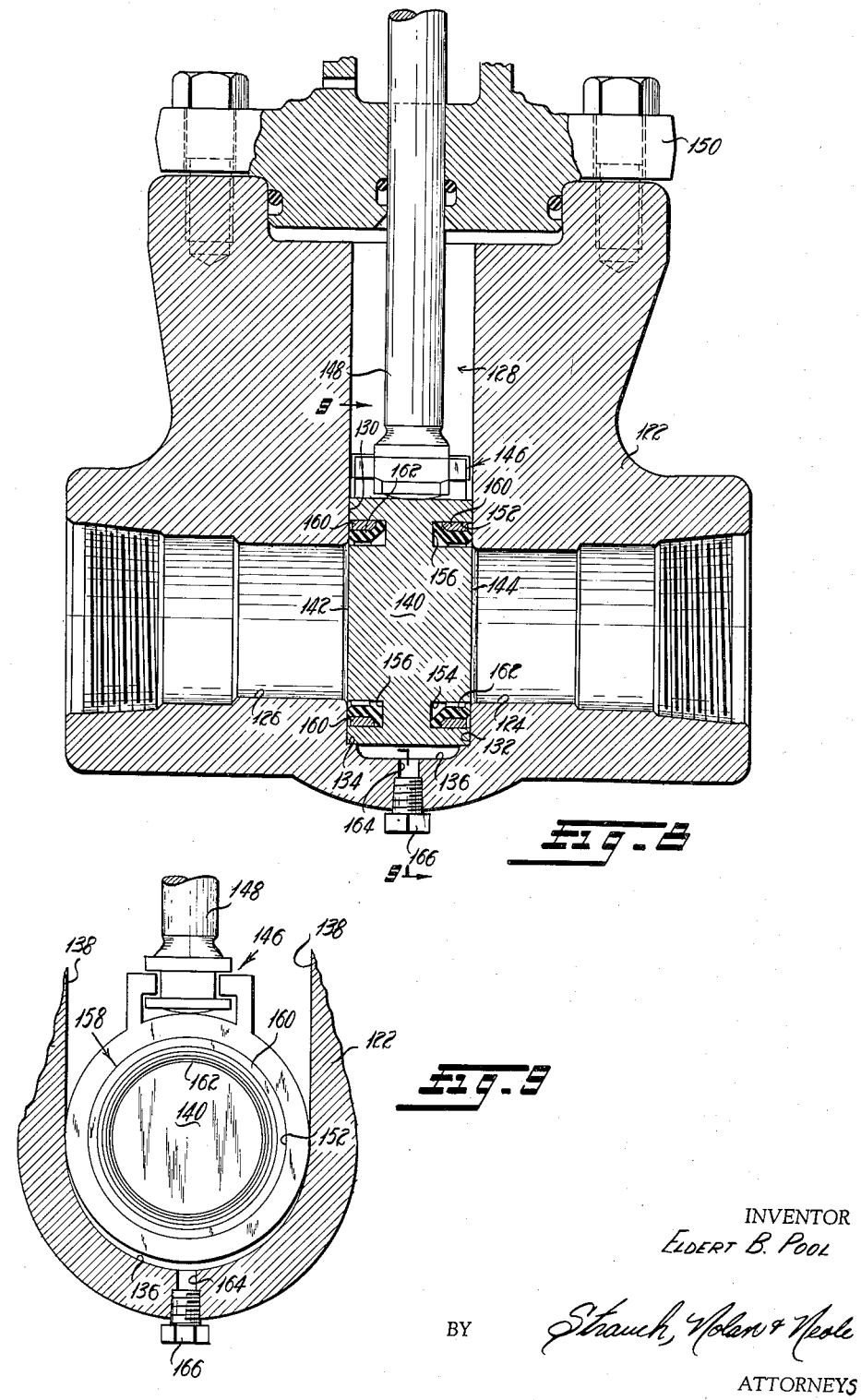

United States Patent Office 2,970,805
Patented Feb. 7, 1961

2,970,805

VALVES HAVING RESILIENT SEALS

Eldert B. Pool, Palos Heights, Ill., assignor to Edward Valves, Inc., East Chicago, Ind., a corporation of Delaware Filed Nov. 14, 1958, Ser. No. 774,026

13 Claims. (Cl. 251—175)

This invention relates to valves and more particularly to valves incorporating improved resilient sealing constructions.

While for purposes of illustration, the invention will be shown as applied to gate valves and to valves having a substantially cylindrical plug member, it is equally applicable to valves having a spherical plug member. The term "plug valve" as used in the specification and claims is intended to embrace both of these major forms of rotatable plug valves and the term "valve" is intended to embrace gate and plug valves.

For many years the valve industry has recognized the desirability of valves incorporating a sealing structure energized by the pressure of the line fluid to be sealed. Such seals eliminate the requirement for the initial establishment by mechanical means of a very high sealing pressure on the mating sealing surfaces of the valve.

The use of a resilient material for the seal eliminates the necessity for finishing the surfaces of the mating parts to very close tolerances. In a prior attempt to eliminate this latter requirement, it has been proposed to seal the mating surfaces of plug valves by a plastic. Valves of this type known as lubricated plug valves have come into wide use. However in certain forms of service, for example in handling liquefied petroleum gas, the lubricants are dissolved in the line fluid causing leakage and high operating torque.

So-called pressure sealed valves embodying sealing elements deformable under line pressure to establish and maintain the seal have also been proposed and some designs have been accepted on a fairly broad basis. However, such valves generally have a relatively short service life because of the tendency of the resilient sealing members to be cut or extruded, particularly as the valve is being moved toward or away from its final seated position.

With the foregoing considerations in mind, it is the principal purpose and object of the present invention to provide improved valves and resilient sealing structures therefor which afford a tight seal without the extreme perfection of surface geometry and finish required in metal-to-metal seating valves and which do not require the use of lubricants or other sealing compounds.

It is a further object of the present invention to provide improved sealing structures for valves in which the seal is formed initially by low mechanical pressure to provide a drop tight seal under zero or relatively low line pressure and the sealing action of which is augmented by the pressure of the fluid being sealed.

It is also an object of the present invention to provide improved valves incorporating resilient sealing structures which may be operated with relatively low forces.

It is a further object of the invention to provide improved plug valves having resilient seals which seal on the upstream side to permit the use of a "telltale" or a vent from the center cavity which may be opened when the main valve is in the closed position to detect malfunction of either seal and to guard against mixing different fluids which may be present in the opposite sides of the valve.

It is also an object of the present invention to provide improved resilient sealing structures for plug valves which prevent hydraulic lock in the valve by the utilization of a novel seal on the downstream side of the valve which permits leakage from the center cavity when this pressure exceeds the downstream pressure by a small differential.

It is an additional object of the present invention to provide symmetrical valves having novel resilient sealing structures carried by the valve closure member and so arranged that the valve may be installed with flow in either direction and in any position.

It is also an object of the present invention to provide improved resiliently sealed valves of relatively simplified construction which may be manufactured and sold at a cost below the cost of valves offering comparable service.

It is a further object of the invention to provide improved valve constructions in which all of the external valve body seals can be replaced without draining the line in which the valve is used.

In accomplishing these and other objects, the invention comprises broadly a valve having a closure member provided with recesses bounded by walls adapted to surround the flow ports of the valve when the valve is closed and composite metal-rubber inserts received loosely in the recesses, the inserts being so constructed and so mounted in the closure member as to provide a positive seal at the upstream side of the valve under all pressures from zero through full operating line pressure and to provide a seal at the downstream side of the valve only at low differential pressures. The composite sealing ring inserts comprise a metal back-up ring to the inner periphery of which is bonded a resilient sealing ring, the two components of the composite sealing structure being so arranged that the metal back-up ring affords complete protection against extrusion, cutting or other damage which might otherwise occur in the resilient sealing ring.

Other objects and advantages of the present invention will become apparent as the description proceeds in connection with the accompanying drawings in which:

Figure 1 is a vertical section of a plug valve incorporating the novel sealing structure of the present invention and showing the parts as they appear when the valve is closed under no pressure;

Figure 2 is an enlarged fragmentary horizontal section of the valve of Figure 1 taken substantially on line 2—2 of Figure 1 but showing the parts under line pressure and with the plug member rotated to the position it occupies as the seal is being broken if the valve is being moved in the opening direction or just as the final seal is being made if the valve is being moved to the closed position;

Figure 3 is an enlarged elevation of the composite sealing element removed from the valve;

Figure 6:
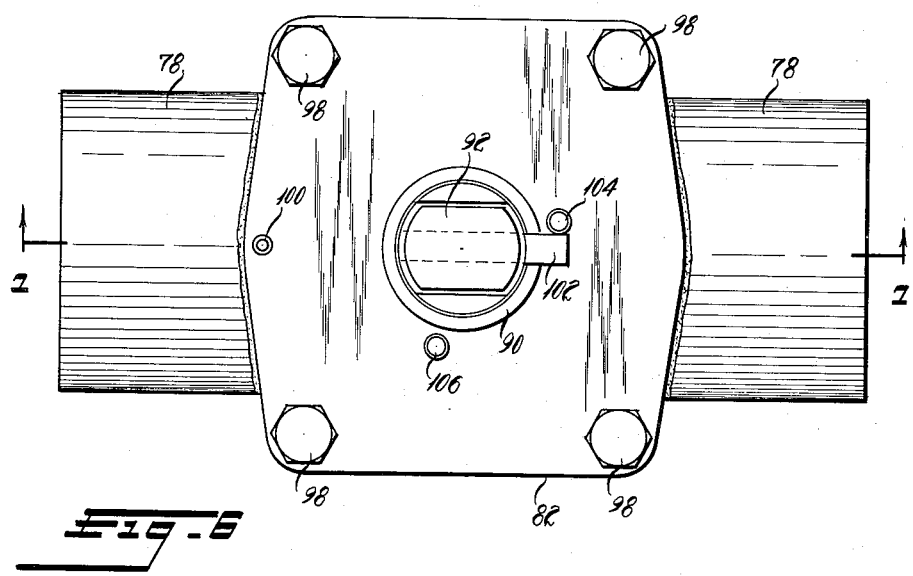
Figure 7:
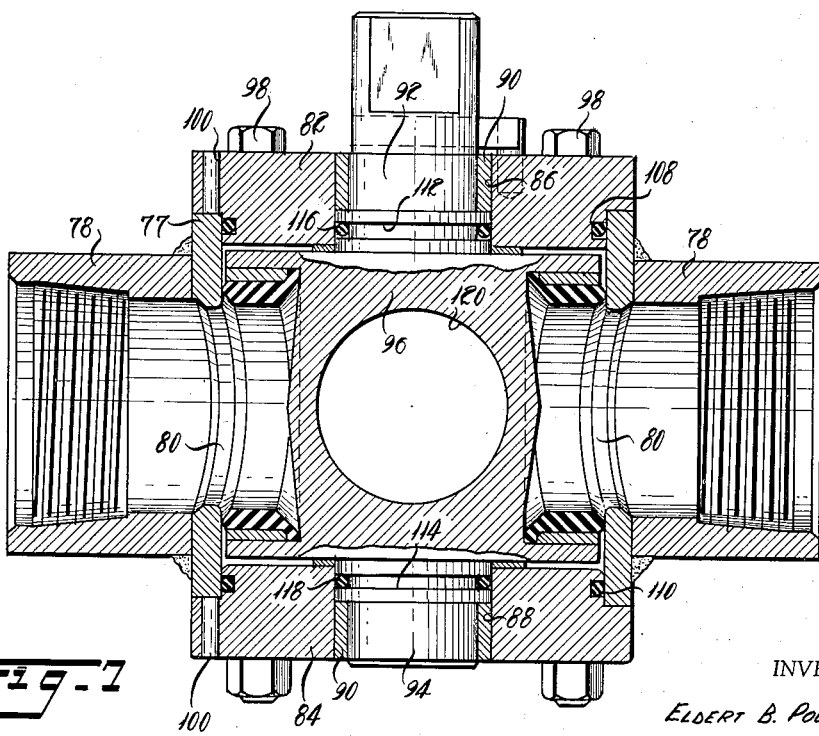

Figures 4 and 5 are sections taken along lines 4—4 of Figure 3 and lines 5—5 of Figure 3, respectively;

Figure 6 is a top plan view of a modified form of the invention;

Figure 7 is a central vertical section taken along line 7—7 of Figure 6;

Figure 8 is a fragmentary vertical section illustrating a gate valve embodying the invention showing the gate closed in the absence of fluid pressure; and Figure 9 is a fragmentary section taken along line 9—9 of Figure 8.

Referring now more particularly to Figure 1, the valve there shown comprises a body 10 provided with flow passages 12 and 14 communicating with a central substantially cylindrical chamber 16. The outer ends of the passages 12 and 14 are tapped to receive standard pipe fittings. The top of the chamber 16 is connected through a cylindrical opening 18 to the bottom of an outwardly facing recess 20 in which a ball bearing assembly 22 is held by a snap ring 24. The other end of the chamber 16 is closed by a cover plate 26 detachably secured to the valve body 10 by a plurality of bolts 28. The cover plate 26 has an integral projection 30 containing an O-ring 32 which sealingly engages the inner cylindrical wall of the chamber 16. The cover plate is also provided with an outwardly opening recess 34 in which a conventional ball bearing assembly 36 is held by a snap ring 37. A central opening 35 connects the recess 34 and the chamber 16.

The cylindrical plug member 38 received within the chamber 16 has a pair of integral trunnions 40 and 42 projecting from its opposite ends outwardly through the openings 18 and 35 in the valve body and cover plate, respectively. The trunnions 40 and 42, which are provided with O-rings 44 which prevent the exit of fluid through the openings 18 and 35 from the central valve cavity, are rotatably supported in the ball bearings 22 and 36 so that the exterior surface of the plug is in clearance relation with the interior of the valve body cavity around its entire periphery. While the clearance is substantial to assure that the plug and valve body will be out of contact under all operating conditions, there is no possibility of damage to the resilient sealing structure as explained in detail below.

The projecting end of the upper trunnion is provided with a handle receiving head 46 of conventional construction and non-rotatably carries an arm 48 which comes to rest against the stop boss 50 when the valve is in closed position. When the plug is rotated 90 degrees to the open position, the indicator arm 48 comes to rest against a corresponding stop not shown.

The plug 38 is provided with a central through passage 52 which, when the plug is rotated 90 degrees from the position shown in Figure 1, directly connects the flow passages 12 and 14. When the valve is rotated to the position shown in Figure 1, the flow passage 52 is moved out of alignment with the passages 12 and 14 which are then sealed by the composite ring structures 54 mounted in annular grooves formed in the plug 38 at opposite sides of the through passage 52. In the form of the invention shown in Figure 1, the grooves are bounded by cylindrical inner and outer walls 56 and 58, respectively, and have a flat annular bottom wall 60.

The composite sealing rings, which are best illustrated in Figures 3, 4 and 5, comprise a metal back-up ring 62 and a rubber sealing ring 64 bonded to the cylindrical inner periphery of the metal back-up ring 62. A material which has been found to have the characteristics required for the ring 64 is Buna "N" having a hardness of 65–75 durometer. However other materials having similar characteristics may be used. The cylindrical outer surface of the ring 62 is received with a close fit against the outer cylindrical wall 58 of the groove. The width of the metal back-up ring 62 is substantially less than the depth of the groove in which it is mounted at all points around the periphery of the ring. The outer edge of the back-up ring 62 has a bevel 66 which follows the contour of the inner periphery of the chamber 16.

The combined thickness of the metal back-up ring 62 and resilient sealing ring 64 is less than the thickness of the groove in which it is received to provide a substantial clearance between the inner periphery of the sealing ring 64 and the cylindrical wall 56 of the groove. The metal bounded by the cylindrical wall 56 can be eliminated entirely in cases where the added strength it imparts to the plug wall is not necessary.

Throughout its length, the depth of the sealing ring 64 is sufficiently greater than the depth of the groove in which it is received so that the ring is uniformly lightly compressed between the inner wall of the chamber 16 and the flat bottom wall 60 of the groove as shown by the phantom lines representing the surfaces 16 and 60 in Figure 4. For this purpose the sealing ring 64 is provided with a portion 67 which projects outwardly to a peak line 68. The sealing ring 64 is also provided with an outwardly flaring projection 70 which overlies the inner edge of the back-up ring 62. This projection is cut away to form a bevel 72. The line 74 which is the inner boundary of the area of the sealing ring contacting the bottom wall 60 of the groove is thus radially outward of the line 68 along which the outer edge of the sealing ring contacts the inner periphery of the valve body. As shown in Figures 1 and 2, the diameter of the inner periphery of the resilient sealing ring 64 is approximately the same as the diameter of the flow passages 12 and 14. Thus the sealing ring 64 contacts the periphery of the wall of the chamber 16 on the annular area extending entirely around each of the flow passages 12 and 14.

The sealing elements and the valve structure itself are entirely symmetrical about the axis of the plug to permit the application of pressure to either of the passages 12 or 14.

As stated above, the dimensions of the parts are such that the rubber seal element 64 is compressed between the chamber 16 of the valve body and the bottom wall 60 of the groove when the valve is assembled. This insures drop tight sealing at no pressure differential. Under these conditions, substantially all of the distortion of the rubber ring 64 will occur in the projection 67 since the rubber in this area may be bent back by the valve body whereas the rubber forming the inner projection 70 is in compression under the metal ring 62 and will be distorted less easily as the valve is assembled. As line fluid pressure is applied, for instance through the passage 14, it communicates freely with the inner surface of the adjacent sealing ring structure. Two seals are established, one by the ridge of resilient material 67 in contact with the valve body and the other by the larger diameter projection 70 at the bottom wall 60 of the groove in which the sealing ring is received. Therefore a force equal to the product of the differential pressure and the annular area between the sealing diameters urges the sealing structure toward the body. The rubber in the projection readily distorts under line pressure permitting the metal ring 62 to come into contact with the body. This significant action prevents extrusion of the rubber past the back-up ring 62 into the center cavity. As the sealing ring structure is moved outwardly, the line pressure maintains the rubber at the outer surface of the projection 70 in tight sealing contact with the groove wall 58. Since the back-up ring 62 has a close fit against the outer wall 58 of the groove, extrusion of the rubber from the bottom of the groove is similarly prevented. The higher the differential pressure, the more firmly the back-up ring is forced against the body and regardless of the pressure level, there is no opportunity for the rubber to be extruded.

The action of the downstream seal may be considered next assuming, for example, that pressure is introduced into the center cavity. Under these conditions, the sealing ring tends to move away from the valve body toward the bottom of the groove since the differential pressure is now acting in this direction on the annular area described above. The sealing insert will therefore be pushed back into the groove to permit leakage to occur to the downstream flow passage. This feature eliminates the possibility of hydraulic lock since pressure in the center cavity is free to bleed into a lower pressure area at the downstream side of the valve. This construction avoids possible damage to the valve due to thermal expansion or vaporization of liquid trapped in the center cavity.

Thus the sealing rings operate as check valves permitting flow from the center of the valve to either end but never from the ends toward the center cavity. Accordingly when the valve is closed, the center cavity may be vented to atmosphere to test the condition of both seals and to prevent intermixing of fluid from the two sides of the valves. A tapped hole 75 is provided at the bottom of the plug for this purpose. The tapped opening 75 is normally fitted with a pipe plug which may be replaced with a gauge valve when telltale action is desired.

Figure 2 shows the position of the plug as the seal is being broken by movement of the plug in a counterclockwise direction toward open position or as the seal is being established as the plug is being moved in a clockwise direction as viewed toward the closed position. First, let it be assumed that the valve is being opened. This is the most dangerous position for any resilient seated valve since the maximum differential pressure is being applied to the seal and the resilient material is most likely to be extruded and damaged by the differential pressure or to be cut as the plug is moved. It is at this point that most prior designs have proved to be unsatisfactory in service. However in the presently disclosed construction the resilient components of the seal are entirely protected against this kind of damage.

It will be noted that more than one-half of the sealing ring as it passes over the opening at the inner end of the passage 12 remains completely supported by the body. This half is in no danger of damage. The first portion of the remaining half of the sealing ring to become unsupported by the body is in the center plane of the valve. It is here that the resilient material is subject to the full differential pressure. The projection 67 of the resilient sealing ring 64 is so shaped that a very shallow angle is presented to the edge of the body port when the latter is approached from either direction as the plug is rotated. This construction together with radius 76 extending around the inner end of the passages 12 and 14 prevents mechanical damage to the rubber. Since the metal back-up ring 62 is located on the downstream side of the resilient sealing ring 64, it therefore protects it at all times from being extruded. Accordingly, the possibility of damage to the resilient sealing structure is entirely eliminated.

The construction of the downstream seal which permits it to leak protects the rubber from extrusion to some extent. However with a large volume of flow the amount of leakage permitted would not be sufficient to prevent extrusion of the downstream insert if it were not bonded to the metal back-up ring 62 to hold it in place. Several prior resiliently sealed valves have been made which have been unsuccessful because of the failure to appreciate the risk of damage to the downstream seal even when the upstream seal was not damaged.

Figures 6 and 7 illustrate a modified form of the invention which, in function, is identical to the embodiment previously described, but which is of simpler construction and is thus preferred because of the very substantial manufacturing economies it permits. In this form of the invention, the valve body comprises a simple tubular section 77 which may be cut from standard tubular stock. Identical tapped conduit sections 78 are welded to the body 77 with their inner ends in surrounding relation with flow ports 80 formed in the wall of the main body member 77. The open ends of the tubular body 77 are closed by substantially identical cover plates 82 and 84 having aligned openings 86 and 88, respectively, in which plain bearings 90 are mounted for rotatably supporting the trunnions 92 and 94 which project from the opposite ends of the valve body 96. The cover plates are held in place by four bolts 98, dowel pins 100 being provided to assure installation of the cover plates in the proper angular position.

The projecting portion of the upper trunnion 92 is provided with a stop indicator lever 102 which bears against stop pins 104 or 106 when the valve is closed or opened, respectively. The valve body per se is sealed by O-rings 108 and 110 received in the respective cover plates 82 and 84. The valve trunnions 92 and 94 are provided with grooves 112 and 114 for O-rings 116 and 118. This construction permits replacement of all of the O-rings without draining the line in which the valve is installed since the seal established by the sealing ring assemblies 54 is not affected by removal of the cover plates and thus affords a significant operating advantage over the construction shown in Figures 1 and 2. The valve plug 96 incorporates a central flow passage 120 and is otherwise identical with the plug 38 except that the cylindrical land in the region within the sealing ring structure has been removed to simplify manufacturing procedures.

In both forms of the invention thus far described, the operating torques are exceptionally low because of the substantial clearance between the plug body and the wall of the valve body and because the trunnion bearings, which absorb all of the lateral load, are formed on a relatively small radius. Also, in both forms of the invention, the axial loads on the plug are completely balanced since the areas bounded by the O-rings 116 and 118 are equal.

As stated above, the invention may also be incorporated in gate valves and such an application is illustrated in Figures 8 and 9 to which detailed reference will now be made.

The valve body indicated generally at 122 has aligned through passages 124 and 126 which open at their inner rounded ends into a central cavity 128. The valve is in all respects symmetrical and either of the passages 124 or 126 may be connected to pressure. The central cavity 128 is defined on two sides by flat walls 130 and 132 which are normal to the axis of the passages 126 and 124 and extend upwardly to the top of the valve body. The bottom of the cavity 128 is defined by an arcuate wall 134 and a central arcuate recess 136. At its upper ends the recess 136 merges smoothly into the wall 134 and above this point each of these wall portions merges into flat vertical walls 138.

A valve gate 140 is provided with flat opposite sides 142 and 144 which are received for free sliding movement along the flat walls 130 and 132. The gate is preferably circular in form and has a diameter substantially greater than the diameter of the passages 124 and 126 and substantially the same as the diameter of the arcuate bottom cavity wall 134. The gate is attached by means of a clip construction 146 to the lower end of a stem 148. The construction of the clip assembly 146 is such that the gate is free to shift slightly in a direction parallel to the axis of the passages 124 and 126.

The upper portion of the valve body is closed and sealed by a bonnet 150 of conventional construction which also supports the upper portion of the stem 148 and carries a stem operating mechanism (not shown) which may take a number of forms but is preferably identical with the construction shown in copending application Serial No. 374,909. The opposite side faces 142 and 144 of the gate are provided with identical annular recesses having outer cylindrical walls 152, inner cylindrical walls 154 and flat bottom walls 156, the diameter of the inner walls 154 being substantially the same as the diameter of the passages 124 and 126.

Identical composite sealing ring structures 158 are received in the valve gate recesses. The sealing rings, which are identical to the rings described in connection with the previous embodiment except that they are not contoured for reception in a cylindrical valve cavity, each comprise an outer metal ring 160 received for free sliding movement against the outer walls 152 of the valve gate recesses and a rubber seal element 162 bonded to the inner periphery of the metal ring 160. The parts are so dimensioned that there is a substantial clearance between the inner diameter of the rubber seal elements 162 and the adjacent inner walls 154 of the valve gate recesses. Thus the sealing rings completely surround the flow passages when the gate is in closed position as illustrated in Figure 8. The axial dimension of the rubber seal elements 162 is such that when the valve gate is closed as shown in Figure 8, they are lightly compressed between the respective surfaces 130 and 156 and 132 and 156 in the absence of fluid pressure. The sealing action of these members is identical to that of the corresponding members described above. Since the valve is completely symmetrical, either end of the valve may be connected to the source of pressure and, as in the plug valve embodiments, the seal is made at the upstream side and the seal at the downstream side permits the escape of any fluid trapped beneath the gate as it is moved toward closed position. Since the seal is made at the upstream side, the valve body may, if desired, be provided with the passage 164 which is normally closed by plug 166 which may be replaced with a telltale gauge by which the condition of the seals can be readily determined.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plug valve comprising a body having inlet and outlet ports communicating with a chamber, a plug mounted for rotation in said chamber between an open position in which a through passage in said plug connects said inlet port to said outlet port and a closed position in which said passage is out of alignment with said ports, said plug having recesses bounded by continuous annular walls surrounding said ports when said plug is in said closed position, a composite sealing ring loosely received in each of said recesses, each sealing ring comprising a metal back-up ring, the outer periphery of which slidably engages said annular wall, and a resilient sealing ring bonded to the inner periphery of said back-up ring and compressed between the bottom of said recess and the surface of said valve body surrounding said port when said valve is closed, said resilient sealing ring being out of contact with the bottom of said recess except in the region adjacent the inner end of said metal back-up ring.

2. The valve structure according to claim 1 wherein the portion of said resilient sealing ring in sealing engagement with the bottom of the said recess is disposed radially outwardly of the portion of the resilient sealing ring in sealing engagement with the valve body whereby the entire composite ring structure is urged outwardly against the wall of said body by the application of line pressure through the adjacent port.

3. The sealing structure according to claim 1 wherein the portion of said resilient sealing ring in engagement with the valve body is radially inwardly deflectable under the application of a small pressure differential to thereby permit the passage of fluid trapped between the upstream and downstream seals to leak past said seals to the downstream side of the valve.

4. A valve comprising a body having inlet and outlet ports communicating with a chamber, a valve closure member mounted for movement in said chamber between open and closed positions, said valve closure member having recesses bounded by continuous annular walls surrounding said ports when said valve closure is in closed position, a composite sealing ring loosely received in each of said recesses, each sealing ring comprising a metal back-up ring, the outer periphery of which slidably engages said annular wall, and a resilient sealing ring bonded to the inner periphery of said back-up ring and compressed between the bottom of said recess and the surface of said valve body surrounding said port when said valve is closed, said resilient sealing ring being out of contact with the bottom of said recess except in the region adjacent the inner end of said metal back-up ring.

5. The valve structure according to claim 4 wherein the portion of said resilient sealing ring in sealing engagement with the bottom of said recess is disposed radially outwardly of the portion of the resilient sealing ring in sealing engagement with the valve body whereby the entire composite ring structure is urged outwardly against the wall of said body by the application of line pressure through the adjacent port.

6. A plug valve comprising a body having inlet and outlet ports comunicating with a chamber, a plug mounted for rotation in said chamber between an open position in which a through passage in said plug connects said inlet port to said outlet port and a closed position in which said passage is out of alignment with said port, said plug having recesses bounded by continuous annular walls surrounding said ports when said plug is in closed position, a composite sealing ring loosely received in each of said recesses, each sealing ring comprising a metal back-up ring the outer periphery of which slidably engages said annular wall, a resilient sealing ring bonded to the inner periphery of said back-up ring and compressed between the bottom of said recess and the surface of said valve body surrounding said port when said valve is closed, the portion of said resilient sealing ring in sealing engagement with the bottom of said recess being disposed radially outward of the portion of the resilient sealing ring in sealing engagement with the valve body whereby the entire composite ring structure is urged outwardly against the wall of said body by the application of line pressure through the adjacent port, trunnions extending from the opposite ends of said plug, and bearings mounted in said body rotatably supporting said trunnions to maintain said plug out of contact with said valve body.

7. A plug valve comprising a body having inlet and outlet ports, a pair of substantially identical cover plates detachably sealingly secured to the opposite ends of said valve body, said cover members having aligned central openings, a substantially cylindrical valve plug having trunnions supported for rotation in said cover plate openings, the outer cylindrical wall of the plug being entirely out of contact with the inner wall of the valve body, said plug having recesses in its opposite sides bounded by continuous annular walls adapted to surround said port when said plug is in closed position, a composite sealing ring loosely received in each of said recesses, each sealing ring comprising a metal back-up ring, the outer periphery of which slidably engages said annular wall, and a resilient sealing ring bonded to the inner periphery of said back-up ring and compressed between the bottom of said recess and the surface of said valve body surrounding said port when said valve is closed, the portion of said resilient sealing ring in sealing engagement with the bottom of said recess being disposed radially outward of the portion of the resilient sealing ring in sealing engagement with the valve body whereby the entire composite ring structure is urged outwardly against the wall of said body by the application of line pressure through the adjacent port.

8. A gate valve comprising a body having inlet and outlet ports communicating with a chamber having substantially flat, annular areas surrounding said port, a gate mounted for movement in said chamber between an open position in which said gate is out of alignment with said ports and a closed position in which said gate is interposed between said ports, said gate having recesses bounded by continuous annular walls surrounding said ports when said gate is in said closed position, a composite sealing ring loosely received in each of said recesses, each sealing ring comprising a metal back-up ring, the outer periphery of which slidably engages said annular wall and a resilient sealing ring bonded to the inner periphery of said back-up ring and compressed between the bottom of said recess and said flat surfaces of said valve body surrounding said ports when said gate is in closed position, the portion of said resilient sealing ring in sealing engagement with the bottom of said recess being disposed radially outward of the portion of the resilient sealing ring in sealing engagement with the valve body whereby the entire composite ring structure is urged outwardly against the wall of said body by the application of line pressure to the adjacent port.

9. A valve comprising a body having inlet and outlet ports communicating with a chamber, a valve closure member mounted for movement in said chamber between open and closed positions, said valve closure member having recesses bounded by continuous annular walls surrounding said ports when said valve closure is in closed position, a composite sealing ring loosely received in each of said recesses, each sealing ring comprising a metal back-up ring, the outer periphery of which slidably engages said annular wall and a resilient sealing ring bonded to the inner periphery of said back-up ring and projecting beyond the ends of said back-up ring and compressed between the bottom of said recess and the surface of said valve body surrounding said port when said valve is closed, said back-up rings supporting said resilient sealing rings against outward radial deflection while permitting inward radial deflection under a relatively low pressure differential whereby each sealing ring structure is effective to prevent fluid flow from the port toward the other port and a telltale connection in said valve body between said ports.

10. A valve comprising a body having inlet and outlet ports communicating with a chamber, a valve closure member mounted for movement in said chamber between open and closed positions, said valve closure member having a recess bounded by a continuous annular wall surrounding a port when said valve closure member is in closed position, a composite sealing ring loosely received in said recess, said sealing ring comprising a metal back-up ring the outer periphery of which slidably engages said annular wall and a resilient sealing ring bonded to the inner periphery of said back-up ring and compressed between the bottom of said recess and the surface of said valve body surounding said port when said valve is closed, the portion of said resilient sealing ring in sealing engagement with the bottom of said recess being disposed radially outward of the portion of the resilient sealing ring in sealing engagement with the valve body whereby the entire composite ring structure is urged outwardly against the wall of said body by the application of line pressure through the adjacent port.

11. In a valve structure, a chamber member having a fluid port therein, a closure member movably disposed in said chamber member for opening and closing said port, said members having confronting surfaces which are moved relatively when said closure member is moved, one of said surfaces having a recess therein surrounding said port when said closure member is in closed position, a composite sealing ring loosely received in said recess, said sealing ring comprising a metal back-up ring the outer periphery of which slidably engages the outer wall of said recess and a resilient sealing ring bonded to the inner periphery of said back-up ring and compressed between the bottom of said recess and the confronting surface of the other member, the portion of said resilient sealing ring in sealing engagement with the bottom of said recess being disposed radially outward of the portion of the resilient sealing ring in sealing engagement with said other member whereby the entire composite sealing ring structure is urged outwardly against said other member by the application of line pressure through the adjacent port.

12. In a valve structure, a chamber member having a fluid port therein, a closure member movably disposed in said chamber member for opening and closing said port, said members having confronting surfaces which are moved relatively when said closure member is moved, one of said surfaces having a recess therein surrounding said port when said closure member is in closed position, a composite sealing ring loosely received in said recess, said sealing ring comprising a metal back-up ring, the outer periphery of which slidably engages the outer wall of said recess and a resilient sealing ring bonded to the inner periphery of said back-up ring, the opposite ends of said sealing ring projecting beyond the ends of said back-up ring and said sealing ring being compressed betwen the bottom of said recess and the confronting surface of the other member in the absence of fluid pressure, the portion of said resilient sealing ring in sealing engagement with the bottom of said recess being disposed radially outward of the portion of the resilient sealing ring in sealing engagement with said other member whereby the entire composite sealing ring structure is urged outwardly against said other member by the application of line pressure through the adjacent port to dispose the outer end of said back-up ring in engagement with said confronting surface in supporting relation with the adjacent portion of said resilient sealing ring.

13. The valve structure according to claim 12 wherein the outer end portion of said resilient sealing ring in engagement with said confronting surface is substantially V-shaped in section with the apex of said V in engagement with said confronting surface.

References Cited in the file of this patent
UNITED STATES PATENTS

| | | | |
|---|---|---|---|
| Re. 24,102 | Ohls | Dec. 13, | 1955 |
| 2,505,270 | Allen | Apr. 25, | 1950 |
| 2,547,831 | Mueller | Apr. 3, | 1951 |
| 2,576,300 | Kreiner | Nov. 27, | 1951 |
| 2,606,740 | Allen | Aug. 12, | 1952 |
| 2,810,543 | Bryant | Oct. 22, | 1957 |
| 2,837,308 | Shand | June 2, | 1958 |
| 2,844,353 | Gurries | July 12, | 1958 |